United States Patent [19]

Kindlmann et al.

[11] E Patent Number: Re. 32,596

[45] Reissued Date of Patent: Feb. 9, 1988

[54] HEAD TOP SURFACE MEASUREMENT UTILIZING SCREEN PARAMETERS IN ELECTROMAGNETIC CASTING

[75] Inventors: Peter J. Kindlmann, Guilford, Conn.; Gary L. Ungarean, Framingham, Mass.; John C. Yarwood, Madison; Derek E. Tyler, Cheshire, both of Conn.

[73] Assignee: Olin Corporation, New Haven, Conn.

[21] Appl. No.: 861,965

[22] Filed: May 12, 1986

Related U.S. Patent Documents

Reissue of:

[64] Patent No.: 4,470,447
Issued: Sep. 11, 1984
Appl. No.: 374,545
Filed: May 3, 1982

U.S. Applications:

[63] Continuation of Ser. No. 137,596, Apr. 7, 1980, abandoned.

[51] Int. Cl.[4] ..... B22D 27/02

[52] U.S. Cl. ..... 164/452; 164/467; 164/503; 164/150; 164/154

[58] Field of Search ..... 164/150, 154, 451, 452, 164/467, 493, 498, 503, 507, 513

[56] References Cited

U.S. PATENT DOCUMENTS 3,204,460 9/1965 Milnes .
3,667,296 6/1972 Schiefer et al. .
3,838,727 10/1974 Levi et al. .
3,842,894 10/1974 Southworth et al. .
4,014,379 3/1977 Getselev .
4,015,128 3/1977 Della Vedova .
4,132,259 1/1979 Poncet .
4,160,168 7/1979 Funck .
4,161,206 7/1979 Yarwood .
4,213,496 7/1980 Yarwood et al. .
4,265,294 5/1981 Gaule et al. .
4,289,946 9/1981 Yarwood et al. .

FOREIGN PATENT DOCUMENTS 913323 10/1972 Canada .
273226 10/1970 U.S.S.R. .
338036 5/1972 U.S.S.R. .
338297 6/1972 U.S.S.R. .
537750 3/1977 U.S.S.R. .

OTHER PUBLICATIONS

". . . Develops New Molten Metal Measuring System for Continuous-Caster . . . ", *Journal of Metals*, Jul. 1979, pp. 14–15.

*Primary Examiner*—Kuang Y. Lin

[57] ABSTRACT

An apparatus and process for casting metals wherein the molten metal is contained and formed into a desired shape by the application of an electromagnetic field. The apparatus includes an inductor and a non-magnetic shield. Changes in the location or the location of the top surface of the molten metal head are continuously displayed during the casting run by monitoring electrical parameters of the electromagnetic casting system including at least one electrical parameter of the nonmagnetic shield.

17 Claims, 5 Drawing Figures

SI

HEAD TOP SURFACE MEASUREMENT UTILIZING SCREEN PARAMETERS IN ELECTROMAGNETIC CASTING

Matter enclosed in heavy brackets [ ] appears in the original patent but forms no part of this reissue specification; matter printed in italics indicates the additions made by reissue.

CROSS REFERENCE TO RELATED PATENTS

This application is a continuation of application Ser. No. 137,596, filed Apr. 7, 1980, now abandoned. This application relates to U.S. Pat. No. 4,213,496 to Yarwood et al. entitled Electromagnetic Casting Apparatus and U.S Pat. No. 4,319,635 to Kindlmann et al. entitled Electromagnetic Casting Process Utilizing an Active Transformer-Drive Copper Shield.

BACKGROUND OF THE INVENTION

One method of controlling the casting process has been the use of an induced electromagnetic field, rather than a mold with definite walls, to both confine and shape the molten metal or alloy which is being cast. This process utilizes a strong electromagnetic field to counterbalance the metallostatic forces effected by the head of molten metal or alloy.

It has generally been necessary to employ relatively low heads of pressure in the molten metal to minimize the power requirements of the electromagnetic field utilized in such a process. Molten metal or alloy head height thus becomes an important parameter to measure, as does any change in head height during an electromagnetic casting run. In addition, metal or alloy head control in such a process should be sufficiently precise to minimize fluctuations in the metallostatic forces and prevent surges of high velocity molten metal streams within the casting. It thus often becomes essential to know the precise location of the metal head top surface at any given instant during an electromagnetic casting run, and to be able to continuously monitor such location during the electromagnetic casting run thereby enabling adjustment of the casting system.

PRIOR ART STATEMENT

There are several prior art systems for measuring the location of the molten metal surface in a container or mold during a continuous casting run. One such system is shown in U.S. Pat. No. 3,204,460 and comprises a plurality of thermocouples spaced vertically along the container walls. The thermocouples measure temperature change within the container and activate an electric circuit in response to such measurement. The invention in the '460 patent is based on the fact that a sharp change in the temperature measured within the container occurs as one travels from a pool of molten metal to a point above the pool and vice versa. The difficulty in adapting this approach to an EM casting system is that there is no molten metal contacting mold wall or container in EM casting in which one can place the thermocouples so as to place them in close proximity with the melt. Moreover, placement of any device between the EM inductor and the load would complicate the casting zone.

Another approach to determining molten metal surface level in a mold during a continuous casting run is disclosed in U.S. Pat. No. 3,667,296. Electrical resistance wire probes are placed into the molten metal being cast. As the molten metal rises or falls, the resistance change in a circuit associated with the probes is ascertained and used as a level indication. The difficulties with using such a system in an EM casting station are several. First, reliability problems exist as a result of having a primary measurement device in contact with the melt. Second, use of probes during electromagnetic casting causes perturbations in the liquid metal meniscus which can result in casting defects. Finally, placement of a measuring device within the primary EM casting zone further complicates the zone.

Use of photo-electric devices, radiation responsive electrical devices, optoelectronic sensors, and electro-optical scanning systems in locating the surface of molten metals in a container during continuous casting is disclosed in U.S. Pat. Nos. 4,015,128, 3,842,894, 3,838,727, 4,132,259, and 4,160,168. All but one of the systems disclosed in these patents position the sensor devices such that the optical axis of the devices is at an angle with respect to the axis of the molten metal continer. The devices thus require a reference point, that is they are utilized in such a fashion that their axes intersect the surface of the molten metal and the walls of the molten metal container. The axis of the photo-electric device in U.S. Pat. No. 4,132,259 intersects the wall of a molten metal feed nozzle. These systems operate within the visable light spectrum and presuppose a clear and uniform distinction between the container/feed nozzle and the molten metal surface color and are primarily useful in color determination rather than temperature determination of the melt. In contrast, an EM casting system has no mold or container walls in contact with the melt to compare with. Moreover, EM systems typically utilize shields and coolant manifolds at the molten metal input ends of the primary casting zone. Utilization of such prior art electro-optical devices in the manner suggested by the aforementioned prior art would thus be complicated by the presence of these elements at the molten metal input end of the EM casting zone. Finally, in operating at the visable light spectrum, these devices are subject to inaccuracies based upon the existence of a dirty environment typically found in and around a casting station.

A method of head measurement which has been used during EM casting runs is depicted in U.S. Pat. No. 4,014,379, Canadian Pat. No. 913,323, and U.S.S.R. Pat. No. 338,036. Disclosed therein is the use of a float device which locates the upper surface of the molten metal being cast. Again, reliability problems associated with having the primary measuring device in contact with or subject to damage by the melt exist. In addition to reliability problems, these prior art patents require that additional equipment be added to the EM containment zone which complicates the EM casting apparatus and places the sensing elements in a very vulnerable position. Moreover, as noted hereinabove, use of such devices during electromagnetic casting may cause surface pertubations in the liquid metal meniscus which can result in casting devices.

Another system for locating the head in an EM casting or containment zone and a continuous casting mold is disclosed in U.S.S.R. Pat. Nos. 338,297, 273,226, and bulletin report section ". . . Develops New Molten Metal Measuring System for Continuous-Casters . . . " in the Journal of Metals, July 1979, pp. 14 and 15. All of these disclosures utilize at least one sensing coil placed in the vicinity of the molten metal surface in a continuous casting system. The impedance value of the coil, which varies as the molten metal moves up or down, is used as an indication of the location of the top surface of the melt. As with feeler and float devices discussed hereinabove, this approach necessitates that additional equipment must be added to the EM containment zone thereby cmplicating the EM casting apparatus and placing the sensing elements in a vulnerable position.

A system utilizing measurement of the in-phase component of the inductor current during an electromagnetic casting process as an indication of the height of the liquid metal head and location of the liquid/solid interface is disclosed in copending U.S. Patent Application Ser. No. 137,645, filed Apr. 7, 1980, now abandoned by Kindlmann et al., for "Determination of Liquid Metal Head in Electromagnetic Casting". At constant frequency, and knowing the air gap between inductor and load and load surface height, the system permits for determination of the actual depth of liquid (the liquid metal head), and location of the liquid/solid interface by utilizing the different resistivities of the solid and liquid states of the metal or alloy being cast. While this system allows for determination of the value of liquid metal head and interface position without interposition of probes or separate measuring devices within the primary EM casting station, it requires a knowledge of the load height, which frequently may vary durng an electromagnetic casting run. Thus, a system which constantly measures load height or which maintains load height steady is required.

A system utilizing a plurality of fiber optic filaments secured within elements of an electromagnetic casting system, e.g. within the shield, and/or manifold and/or inductor, to measure and determine the load height and location of the liquid-solid interface is disclosed in copending U.S. patent application Ser. No. 111,244, filed Jan. 11, 1980, by Ungarean et al. for "Infrared Imaging for Electromagnetic Casting". The system uses infrared radiation emitted from the surface of the forming ingot as a measure of the desired parameters. This system has the benefits of not requiring the insertion of probes and separate devices into the primary casting zone, and provides other information, such as liquidus temperature and maximum temperature. One problem, however, is that the system of filaments must be inserted within elements of the casting system, requiring modification of the affected elements.

The present invention overcomes the deficiencies described above and provides an accurate means for measuring and locating the molten metal or alloy head top surface location in an electromagnetic casting station without necessitating the introduction of any sensing element into the primary electromagnetic casting zone and does so simultaneously, reliably, and without creation of any safety hazards (such as would be introduced for example by devices utilizing high energy radiation). In addition, the measuring system of the present invention operates efficiently in less than perfectly clean environments such as those typically found in and around an electromagnetic primary casting zone.

All patents and publications described herein are intended to be incorporated by reference.

SUMMARY OF THE INVENTION

This invention relates to a process and apparatus for head top surface location monitoring during electromagnetic containment by utilizing the current being induced in an existing electromagnetic mold screen or shield either alone or with other electrical parameters as an indicator of head top surface location.

The purpose of non-magnetic screens or shields in electromagnetic casting system is to balance magnetic pressure with hydrostatic pressure over the total height of the molten metal or alloy head. Without the molten metal or alloy, the shield alone acts as the load, and substantial current is induced in the shield. When the load is introduced, currents are induced into both the shield and the load. For particular geometric and alloy casting systems, this induced shield current, either alone or in conjunction with other electromagnetic system parameters, can serve as a basis for determining where the top surface of the head is in relation to the shield or some other datum point. For each particular alloy and geometric casting system, empirical testing and modeling is utilized to establish the relationship between these parameters and the location of the top surface of the head.

In accordance with a preferred embodiment, an electrical parameter of the non-magnetic shield is measured and monitored during a casting run. The value of this parameter is then compared with a table or chart relating load top surface location and the parameter in question to provide an indication of the location of the top surface or changes in the location of the top surface relative to a datum point.

In another preferred embodiment electrical parameters of both the shield and the inductor are simultaneously monitored during a casting run and utilized to provide a signal indicative of the head top surface location.

The process and apparatus of this invention can be carried out using either analog or digital circuitry or combinations thereof.

Accordingly, it is an object of this invention to provide an improved process and apparatus for continuously monitoring the location or changes in location of the head top surface during an electromagnetic casting run without insertion of or placing or probes or other devices into the primary casting zone and without requiring alterations in the construction of the inductor, non-magnetic shield, or other elements of the electromagnetic casting apparatus.

It is a still further object of this invention to utilize at least one electrical parameter of the nonmagnetic shield in an electromagnetic casting system to provide a signal indicative of the head top surface location and/or changes therein during an electromagnetic casting run.

These and other objects will become more apparent from the following description and drawings.

DETAILED DESCRIPTION OF THE PREFERRED EMBODIMENTS

Figure 1:
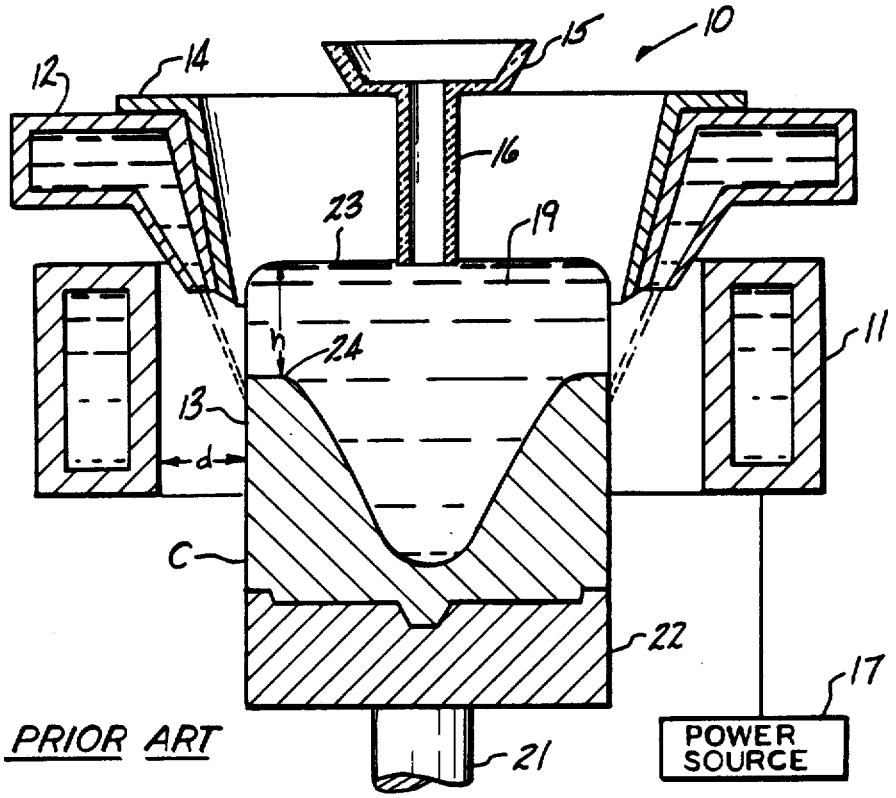
FIG. 1 is a schematic representation of a prior art electromagnetic casting apparatus.

Referring now to FIG. 1, there is shown by way of example a prior art electromagnetic casting apparatus such as that shown in U.S. Pat. No. 4,161,206.

The electromagnetic casting mold 10 is comprised of an inductor 11 which is water cooled; a cooling manifold 12 for applying cooling water to the peripheral surface 13 of the metal being cast C; and a non-magnetic shield 14. Molten metal is continuously introduced into the mold 10 during a casting run, in the normal manner using a trough 15 and down spout 16 and conventional molten metal head control. The inductor 11 is excited by an alternating current from a power source 17.

The alternating current in the inductor 11 produces a magnetic field which interacts with the molten metal head 19 to produce eddy currents therein. These eddy currents in turn interact with the magnetic field and produce forces which apply a magnetic pressure to the molten metal head 19 to contain it so that it solidifies in a desired ingot cross section.

An air gap d exists during casting between the molten metal head 19 and the inductor 11. The molten metal head 19 is formed or molded into the same general shape as the inductor 11 thereby providing the desired ingot cross section. The inductor may have any desired shape including circular or rectangular as required to obtain the desired ingot C cross section.

The purpose of the non-magnetic shield 14 is to balance the magnetic pressure with the hydrostatic pressure of the molten metal head 19. The non-magnetic screen 14 may comprise a separate element as shown or may, if desired, be incorporated as a unitary part of the manifold for applying the coolant.

Initially, a conventional ram 21 and bottom block 22 is held in the magnetic containment zone of the mold 10 to allow the molten metal to be poured into the mold at the start of the casting run. The ram 21 and bottom block 22 are then uniformly withdrawn at a desired casting rate.

Solidification of the molten metal which is magnetically contained in the mold 10 is achieved by direct application of water from the cooling manifold 12 to the ingot surface 13. In the embodiment which is shown in FIG. 1, the water is applied to the ingot surface 13 within the confines of the inductor 11. The water may be applied to the ingot surface 13 above, within or below the inductor 11 as desired.

As stated in the Background of the Invention, it is often necessary to know the precise location of the surface 23 of molten metal 19 and to be able to maintain that location relatively constant during the electromagnetic casting run. For example, in the prior art approach of the Getselev U.S. Pat. No. 4,014,379, a constant voltage is maintained across the inductor and a corrective voltage responsive to the height of the top surface of the molten metal head is employed to control the inductor current. It is the purpose of this invention to utilize the current being dissipated in the existing non-magnetic shield 14, alone or in conjunction with other electrical parameters of the electromagnetic casting system, as an indicator of head top surface height.

In an electromagnetic casting system such as that depicted in FIG. 1, the shield and the ingot being cast constitute loads to the inductor, and currents are induced in these loads. The magnitudes and the phase relationships of the induced currents are a function of several electrical parameters relating to the resistance and geometry of the electromagnetic casting configuration. The reactive parameters of the electromagnetic casting configuration relate primarily to geometrical factors, so if one looks at reactive parameters during a casting run, then one is in effect measuring dimensional changes.

As one of the elements is moved, typically the ingot being cast, the reactance of the load will change and the interrelationships of induced currents will change based on how one moves the element, that is, whether the molten head gets higher or wider. If the diameter of the ingot is held roughly constant (highly desired), then one variable in the system is removed and a more direct relationship between reactance effects and load geometry will exist. It should readily be apparent that if the diameter of the ingot is permitted to vary (highly undesirable), then some measurement of the ingot diameter must be made and accounted for in any calibration.

Because of the complex and non-uniform current distribution in the finite size conductors in a casting configuration such as that depicted in FIG. 1, theoretical calculation of resistive and reactive parameters require complex finite-element computer simulations, direct physical modeling is usually preferable, especially when head height will vary (or be allowed to vary) even over only a small range. That is, knowing the metal or alloy which is to be electromagnetically cast and the geometry of the electromagnetic casting system, a bench model, including a load model element, approximating the overall casting system can be set up. Measurements can then be made as to the relationship between the height of the top surface of the head portion of the load model element and the electrical parameter or parameters being monitored. The load model element should comprise two parts: the upper portion consisting of a material which has a resistivity approximating that of the molten alloy (head 19) above the solidification front 24 and a lower portion which approximates the resistivity of the metal being cast C below the solidification front 24.

The goal in the present process is to measure an electrical parameter or parameters in the casting system which reflects the changing height of the head top surface. It is not the head height h which is being measured but rather the location or a change in location of the head top surface which is being monitored. By picking a zero reference point such as for example the bottom of the inductor and by utilization of a bench model as discussed hereinabove, appropriate scaling can be performed by empirical measurement based solely on experiment and observation of a particular geometrical and alloy electromagnetic casting system. Thus, the load model element, consisting of its two distinct portions approximating the resistivity of the metal being cast both above and below solidification front 24 can be passed longitudinally in increments through a casting zone approximated by the other model elements of the casting system, that is, through a zone established by a non-magnetic shield model element and an inductor model element. Measurements of the one or more electrical parameters can then be made for different values of location of the top surface of the molten metal head model element relative to the reference point to establish a chart or table which can be utilized during a casting run to enable determination of head surface location continuously or semi-continuously during the casting run. Since normally only a small head top variation can be permitted during a casting run, tabulation of the dependencies between head top and the various other electrical and geometric parameters needs to be done over only a narrow range. Use of such a table or chart will be elaborated upon hereinafter.

In a first and most preferred embodiment of the present invention the only electrical parameter which is monitored as an indication of head top surface location is the current through the shield. In order to utilize just this single parameter, a controlled inductance constant ingot diameter system, such as that disclosed in U.S. Pat. No. 4,161,206 to Yarwood et al. must be used. Such a system is depicted in FIG. 2.

Figure 2:
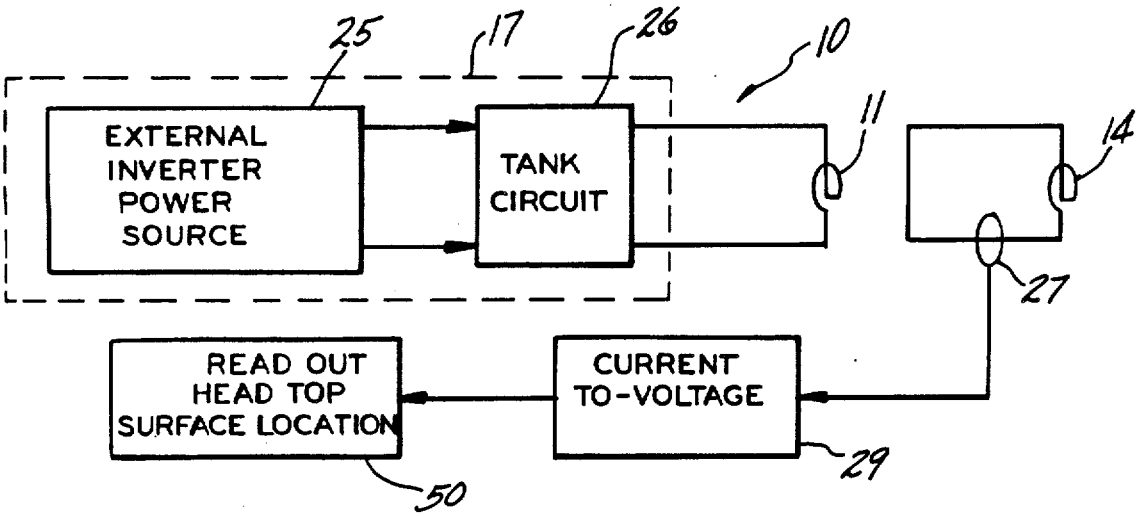
FIG. 2 is a block diagram of a monitoring system in accordance with one embodiment of this invention showing monitoring of the shield current as an indication of head top surface location.

In the case of the FIG. 2 embodiment, an ingot model having a fixed diameter approximating that of the ingot to be case and upper and lower segments having resistivities closely approximating the resistivities of the molten head and solid ingot portions of the metal to be cast is moved up and down within an electromagnetic model station. The model inductor and shield are of the same geometry as that of the system to be run and in fact may be the actual inductor and shield which will be used to cast the ingot. Values of the current in the shield are then plotted as a function of head top surface height. In similar manner, a model having a different total head portion is passed up and down in the modeling system so that the effects of total head and, therefore, resistivities for different head height are taken into account. Several ingot model increments and head height proportions are run so as to establish a chart of sufficient significance as to allow for variations which can be expected during the actual casting run.

Having thus plotted or charted the relationship between head surface location and other system or ingot geometry and the current through the shield, a functioning electromagnetic casting station, and in particular the current through the shield in such a station, can be monitored during a casting run via standard techniques. The thus obtained signal would then be the input to a computing network programmed with the model chart or to a scaling network and readout device which would read out head top surface location as defined by measurement of the appropriate electrical parameter, in this instance the current through the shield.

Such a monitoring and readout system is shown in FIG. 2. Referring to FIG. 2, inductor 11 is shown connected to an electrical power supply 17 which provides the necessary current to the system at a desired frequency and voltage. As disclosed in aforementioned U.S. Pat. No. 4,161,206, a power supply circuit may be considered as two subcircuits 25 and 26. The external circuit 25 consists essentially of a solid state generator providing an electrical potential across the load or tank circuit 26 which includes the inductor 11. Tank circuit 26 except for the inductor 11 is sometimes referred to as a heat station and includes elements such as capacitors and transformers. Both external circuit 25 and tank circuit 26 may be of a conventional design.

The current in non-magnetic shield 14 may be sensed by a conventional current sense pickup device 27 such as a current transformer. A current-to-voltage scaling resistor network 29 generates a corresponding voltage. The output signal eminating from current-to-voltage scaling resistor network 29 can then be read out on a head top surface location readout device 50 which has been calibrated in accordance with bench model testing measurements during the model testing procedure disclosed hereinabove to indicate head surface location. Calibration of readout device 50 has been carried out during bench model testing of a metal or alloy and casting system (inductor and shield) model of the same geometry as the electromagnetic casting system being run and monitored.

In utilizing the current in the shield as a parameter in the process of the instant invention, certain basic assumptions can be made. Thus for example, it can be assumed that the shield resistance and casting temperatures are roughly constant so that the current in the shield relates primarily to head top surface height with respect to the inductor and the shield.

Figure 3:
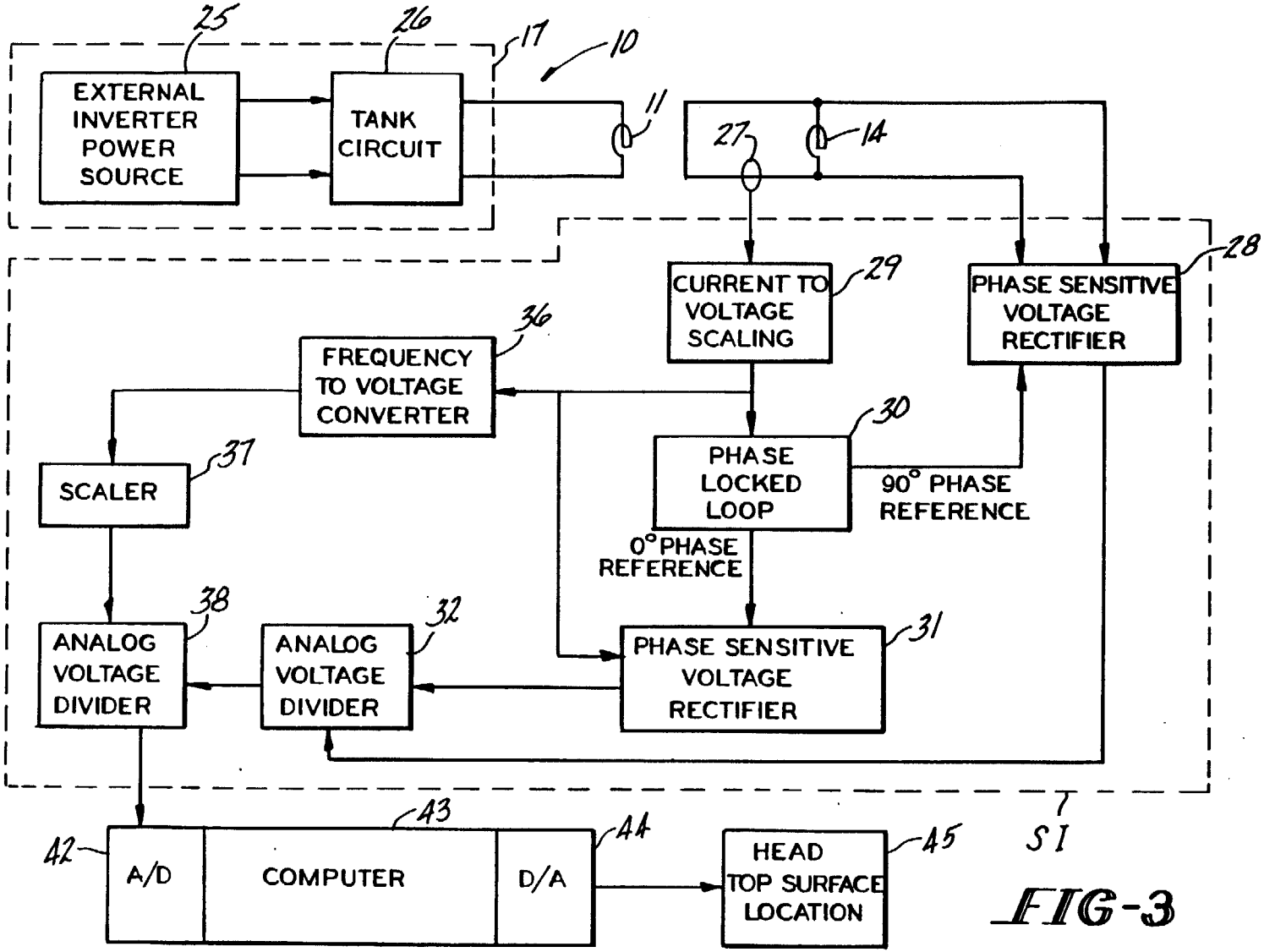
FIG. 3 is a block diagram of a monitoring system in accordance with another embodiment of this invention showing monitoring of the shield inductance as an indication of head top surface location.

In accordance with the present invention, changes in the electrical parameters of the ingot-inductor-shield system, including shield or shield and inductor parameters, are sensed in order to sense changes in head top surface location. FIG. 3 shows a second embodiment of the present invention wherein the shield inductance is utilized as the electrical parameter indicative of head surface location in a constant ingot cross section electromagnetic casting system.

The inductance of the shield 14 may be sensed as in FIG. 3 by measuring the voltage across the shield 14 90° out of phase to the current through the shield and dividing that signal by the current measured in the shield. The voltage induced into a closed shield can be measured by use of a wire or ribbon conductor tightly wrapped around the perimeter of the shield but insulated from it. A current transformer 27 senses the current in shield 14. A current-to-voltage scaling resistor network 29 generates a corresponding voltage. This voltage is fed to a phase-locked loop circuit 30 which "locks" onto the fundamental of the current waveform and generates two sinusoidal phase reference outputs, with phase angles of 0° and 90° with respect to the current fundamental. Using the 0° phase reference, phase-sensitive rectifier 31 derives the fundamental frequency current amplitude. The 90° phase reference is applied to phase-sensitive rectifier 28 which derives the fundamental voltage amplitude due to inductive reactance. The voltage signals from phase sensitive voltage rectifiers 28 and 31 which are properly scaled are then fed to an analog voltage divider 32 wherein the voltage from rectifier 28 is divided by the voltage from rectifier 31 to obtain an output signal which is proportional to the reactance of the shield 14 and load 19. In order to permit operation of the electromagnetic casting system in a variable frequency mode of operation, the circuit of FIG. 3 may include a frequency to voltage converter 36. Thus, the frequency of the current through the shield 14 is sensed and a voltage signal proportionate thereto is generated by the frequency to voltage converter 36 connected to the output of the current to voltage scaling circuit 29. The output of the converter 36 is properly scaled to the output of the divider 32 by scaling circuit 37. A second analog voltage divider 38 is provided for dividing the output of the first voltage divider 32 by the proportionate voltage from the frequency to voltage converter 36. The output signal of the second divider 38 represents the inductance of the shield 14 and the load 19. This signal is fed to an analog to digital converter 42 which converts them into an appropriate digital form. The output of the analog to digital converter is fed to a computer 43, such as a minicomputer or microprocessor as, for example, a PDP-8 with Dec Pack manufactured by Digital Equipment, Inc. The computer 43 is programmed to use the signal from analog voltage divider 38 in conjunction with preprogrammed geometrical and electrical parameter data to compute via a programmed chart established through empirical testing data (prepared as disclosed hereinabove) where the head top surface is located in respect to some datum point or to compute variations in head top surface location with respect to said datum point. The computer 43 then generates a signal corresponding to the head top surface location or differences in head top surface location to analog converter 44 to convert the signal into an analog form which can be read on readout device 45.

Monitoring of the shield 14 inductance may be digital, analog, or a combination of both, and the circuit of FIG. 3 represents one preferred form of carrying out the monitoring and parameter determining steps of the present invention. Reference is made to the aforementioned U.S. Pat. No. 4,161,206 which shows digital and analog circuitry performing the same or similar control functions with respect to an electromagnetic casting system. However, in accordance with the present invention the use of a microprocessor or computer is highly desirable because such a device can readily extrapolate between varying points in a chart and would, therefore, be more efficient in continuously providing the head top surface location or variation readout desired.

Figure 4:
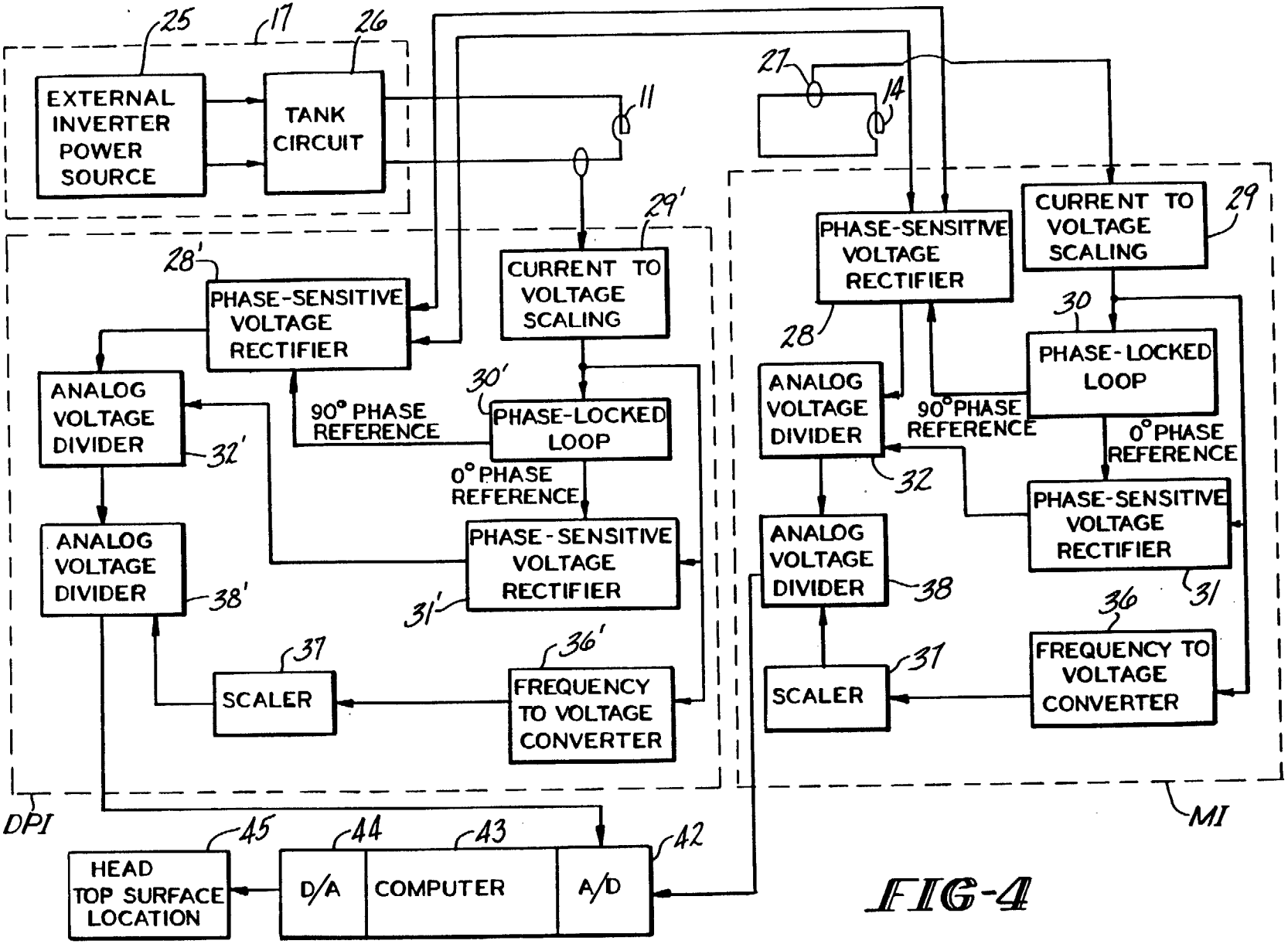
FIG. 4 is a block diagram of a monitoring system in accordance with yet another embodiment of this invention showing monitoring of driving point inductance and mutual inductance as an indication of head top surface location.

FIG. 4 depicts another embodiment of the present invention wherein the drive point inductance and the mutual inductance of the inductor and shield represent the monitored parameters in determining head top surface location or head top surface location variation. Such a system is somewhat less sensitive to variations of certain values from one casting run to another, such as resistivities, resistances of the inductor or shield, and would be a quite attractive alternative under a voltage controlled electromagnetic casting system.

The mutual inductance monitoring portion MI of the FIG. 4 circuit comprises the same elements as the inductance monitoring elements of the shield inductance portion SI of FIG. 3 with the voltage measurement fed into phase sensitive voltage rectifier 28 being taken across the inductor 11 rather than the shield 14. Utilizing the voltage across inductor 11 in this fashion brings about a monitoring of the mutual inductance of the system.

The driving point inductance is monitored by feeding the current through inductor 11 and the voltage across inductor 11 to the devices numbered 28' and 29', 30', 3', 32', 36', 37', and 38' within circuit DPI. These devices operate in the same way as the devices within the circuits labeled SI in FIG. 3 and MI in FIG. 4 and are designated by the same numbering with the exception of the addition of primes. Since the operation on the currents and voltages monitored is essentially the same, their operation will not be further described in conjunction with FIG. 4.

As in the case of the shield inductance monitoring system of FIG. 3, the mutual inductance and drive point inductance signals from voltage dividers 38 and 38' are fed to an analog to digital converter 42 which converts them into digital form.

After model testing to establish a table representing the relationship between mutual and driving point inductance and head top surface location for a given model or models, the computer 43 is programmed by storing the table in its memory. As the casting run is carried out, the computer continuously provides a signal via analog converter 44 and readout device 45 representative of the head top surface location for varying values of mutual inductance and driving point inductance. As stated hereinabove, computer 43 is particularly adaptable for interpolating between specific table points at any given instant during the casting run.

Figure 5:
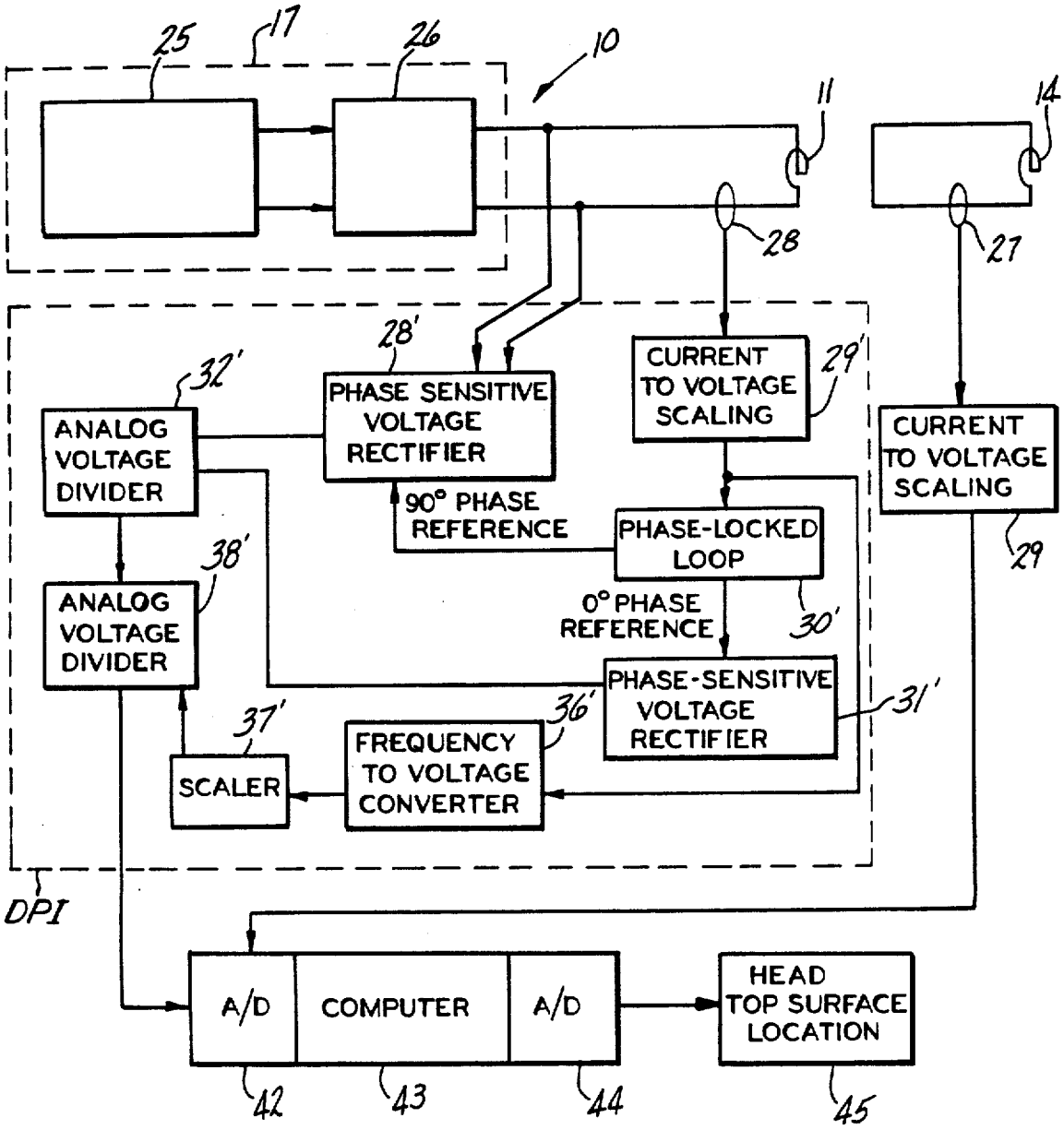
FIG. 5 is a block diagram of a monitoring system in accordance with another embodiment of this invention showing monitoring of shield current and driving point inductance as an indication of head top surface location.

FIG. 5 depicts yet another embodiment of the present invention. In this embodiment the driving point inductance is monitored by the circuit portion of FIG. 5 marked DPI in the manner described with respect to the inductance monitoring systems designated DPI in FIG. 4 and SI in FIG. 3. In this particular embodiment the current through the shield is sensed by current sense pickup device 27. Current-to-voltage scaling resistor network 29 then generates a corresponding voltage signal which is delivered to analog-to-digital converter 42 along with the signal from analog-to-digital divider 38' which is representative of the driving point inductance. As was the case with the FIGS. 3 and 4 embodiments, computer 43 is programmed with a table or chart established by empirical model testing so as to indicate head top surface location or change as a function of shield current and driving point inductance.

It should be apparent that other electrical parameters which include the current in the shield could be utilized in accordance with the present invention. For example in the absence of inductance measuring circuitry, that is when utilizing voltage control circuitry, it is possible to measure head top surface height or variations therein utilizing measurement of two current parameters at constant voltage. In this approach the current through the inductor and the current through the shield are monitored, while the voltage on the inductor is held constant. It would then be readily possible to determine empirically the position of the top surface of the head 19. As the head rises, the current in the inductor rises and the current in the shield goes down. Working with models as disclosed hereinabove, it would be possible to empirically establish the relationship between the head top surface location and the currents being monitored. However, head height measurements based on inductances are relatively insensitive to alloy, so it is felt that measurements based on inductances are the most direct.

It should also be apparent that the more parameters which must be manipulated and measured, and the more manipulations which are determined by empirical measurements for various alloys and station geometries, the more attractive the use of a computer or microprocessor or digital means becomes. Utilization of a digital approach allows for more ready manipulation of the various variables in accordance with the instant invention. The data acquisition properties of a computer can actually create a table relating the head top surface location to the various parameters being monitored and/or controlled. When utilizing a computer, a space grid of values so established can be used in an interpolative sense whereas when utilizing analog circuits, one must use actual values.

It should, of course, be apparent that the high speed with which head top surface location readout can be displayed and generated via a computer in response to electrical parameter signals would be quite desirable. In addition, a high degree of sensitivity and flexibility is typically associated with the use of digital circuitry and computer programming.

It should, of course, also be understood that the processing mode of the voltage and current signals monitored in the electromagnetic circuit may be analog, digital, or a hybrid of both. See for example the alternative analog or digital processing systems of U.S. Pat. No. 4,161,206.

The programming of the computer 43 and its memory can be carried out in a conventional manner and, therefore, such programming does not form a part of the invention herein.

The prior art citations set forth in this application are intended to be incorporated by reference herein.

It is apparent that there has been provided with this invention a novel head top surface location measurement process and system utilizing screen inductance in electromagnetic casting which fully satisfy the objects, means, and advantages set forth herein before. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a process for electromagnetically continuously and semi-continuously containing and forming molten material during a casting run into a casting of desired shape, said casting having a head of molten material during said casting run, said electromagnetic containing and forming including the steps of:

providing an inductor;

applying a current in and a voltage across said inductor to generate and apply a magnetic field to said molten material;

providing a non-magnetic shield associated with said inductor for attenuating and shaping said magnetic field;

applying said magnetic field to said molten material;

attenuating and shaping said magnetic field by inducing a current in said non-magnetic shield; and monitoring the location of the top surface of said molten material head;

said step of monitoring comprising the steps of:

determining at least one electrical parameter of the electromagnetic casting system comprising the step of sensing the current in said nonmagnetic shield which varies with variations in the head top surface location;

empirically establishing a relationship between the location of said head top surface and said at least one electrical parameter; and in response to the sensed current, generating a signal which by comparison with the empirically established relationship indicates the location of said head top surface.

2. In a process for electromagnetically continuously and semi-continuously containing and forming molten material during a casting run into a casting of desired shape, said casting having a head of molten material during said casting run, said electromagnetic containing and forming including the steps of:

providing an inductor;

applying a current in and a voltage across said inductor to generate and apply a magnetic field to said molten material;

providing a non-magnetic shield associated with said inductor for attentuating and shaping said magnetic field;

applying said magnetic field to said molten material;

attentuating and shaping said magnetic field by inducing a current in said non-magnetic shield; and monitoring the location of the top surface of said molten material head;

said step of monitoring comprising the steps of:

determining at least one electrical parameter of the electromagnetic shield comprising the step of sensing the inductance in said non-magnetic shield which varies with variations in the head top surface location;

empirically establishing a relationship between the location of said head top surface and said at least one electrical parameter; and in response to the sensed inductance, generating a signal which by comparison with the empirically established relationship indicates the location of said head top surface.

3. In a process for electromagnetically continuously and semi-continuously containing and forming molten material during a casting run into a casting of desired shape, said casting having a head of molten material during said casting run, said electromagnetic containing and forming including the steps of:

providing an inductor;

applying a current in and a voltage across said inductor to generate and apply a magnetic field to said molten material;

providing a non-magnetic shield associated with said inductor for attenuating and shaping said magnetic field;

applying said magnetic field to said molten material;

attenuating and shaping said magnetic field by inducting a current in said non-magnetic shield; and monitoring the location of the top surface of said molten material head;

said step of monitoring comprising the steps of:

determining at least one electrical parameter of the electromagnetic casting system comprising the step of sensing the mutual inductance of said non-magnetic shield and said inductor and the driving point inductance of inductor, which inductances vary with variations in the head top surface location;

empirically establishing a relationship between the location of said head top surface and said at least one electrical parameter; and in response to the mutual inductance and the driving point inductance, generating a signal which by comparison with the empirically established relationship indicates the location of said head top surface.

4. In a process for electromagnetically continuously and semicontinuously containing and forming molten material during a casting run into a casting of desired shape, said casting having a head of molten material during said casting run, said electromagnetic containing and forming including the steps of:

providing an inductor;

applying a current in and a voltage across said inductor to generate and apply a magnetic field to said molten material;

providing a non-magnetic shield associated with said inductor for attenuating and shaping said magnetic field;

applying said magnetic field to said molten material;

attenuating and shaping said magnetic field by inducing a current in said non-magnetic shield; and monitoring the location of the top surface of said molten material head;

said step of monitoring comprising the steps of:

determining at least one electrical parameter of the electromagnetic casting system comprising the step of sensing the current in said non-magnetic shield and the driving point inductance of said inductor, which current and inductance both vary with variations in the head top surface location;

empirically establishing a relationship between the location of said top surface and said at least one electrical parameter; and in response to the sensed current and the driving point inductance, generating a signal which by comparison with the empirically established relationship indicates the location of said head top surface.

5. A process as in claims 1, 2, 3 or 4 wherein said empirically establishing step includes comparing said determined at least one electrical parameter to a preprogrammed table establishing the relationship between said at least one electrical parameter and the location of said head top surface for the particular casting system.

*6. In a process for electromagnetically continuously and semi-continuously containing a head of molten material and forming said molten material head into a casting of desired shape, said electromagnetic containing and forming process including the steps of:*

*providing an electromagnetic casting system including an inductor;*

*applying a current and a voltage to said inductor to generate and apply a magnetic field to said molten material;*

*providing a non-magnetic shield associated with said inductor for attenuating and shaping said magnetic field;*

*applying said magnetic field to said molten material;*

*attenuating and shaping said magnetic field by inducing a current in said non-magnetic shield;*

*determining at least one electrical parameter of said electromagnetic casting system comprising the step of sensing the mutual inductance between a component of said system and said inductor.*

*7. The process of claim 6 wherein:*

*said sensing step comprises sensing the mutual inductance of said shield and said inductor.*

*8. The process of claim 7 wherein said sensing step further comprises:*

*sensing the driving point inductance of said inductor and generating a signal in response to said mutual inductance and said driving point inductance.*

*9. The process of claim 8 further comprising:*

*said signal generating step further including comparing said signal with an empirically established relationship between said inductances and the location of a surface of said head surface.*

*10. An apparatus for electromagnetically containing a head of molten material and forming said head of molten material into a casting of desired shape, said apparatus comprising:*

*a containment inductor and means for applying a current and a voltage to said inductor for generating and applying a magnetic field to said molten material;*

*a non-magnetic shield associated with said inductor for attenuating and shaping said magnetic field; and*

*means for monitoring the location of a surface of said molten material head and for generating a signal indicative of said location, said monitoring means comprising a conductor wrapped about the perimeter of said shield.*

*11. The apparatus of claim 10 wherein said conductor comprises a wire conductor.*

*12. The apparatus of claim 10 further comprising said conductor being tightly wrapped about and electrically insulated from said shield.*

*13. The apparatus of claim 10 further comprising said conductor measuring a voltage induced into said shield by said inductor.*

*14. A system for electromagnetically containing a head of molten material and forming said molten material into a casting having a desired shape, said system comprising:*

*a containment inductor and means for applying a current and a voltage to said inductor for generating and applying a shaping magnetic field to said molten material;*

*a non-magnetic shield associated with said inductor for attenuating and shaping said magnetic field; and*

*means for determining at least one electrical parameter of said system and for generating a signal indicative of a physical parameter of said system, said determining and generating means including means for sensing the mutual inductance between a component of said system and said inductor.*

*15. The system of claim 14 wherein:*

*said sensing means comprises means for sensing the mutual inductance of said shield and said inductor; and*

*said signal generating means comprises means for generating a signal indicative of the location of a surface of said head.*

*16. The system of claim 15 wherein said sensing means further includes means for sensing the driving point inductance of said inductor.*

*17. The system of claim 16 wherein said determining and generating means further includes means for comparing said inductances with an empirically established relationship and for generating said signal in response to said comparison.*

* * * * *